United States Patent [19]

Fidi et al.

[11] 3,739,195

[45] June 12, 1973

[54] REMOTELY CONTROLLED ELECTRONIC DIFFERENTIAL RESISTANCE

[75] Inventors: Werner Fidi, Baden; Ewald Kerschbaum, Maria Enzersdorf-Sudstadt, both of Austria

[73] Assignee: AKG Akustische u. Kino-Gerate Gesellschaft m.b.H., Wien, Austria

[22] Filed: Oct. 21, 1971

[21] Appl. No.: 191,513

[52] U.S. Cl. .................. 307/229, 307/297, 330/30 D

[51] Int. Cl. .................. H03k 17/00

[58] Field of Search .................. 307/254, 229, 230, 307/296, 297; 328/210; 330/29, 32, 15, 30 D, 69, 91

[56] References Cited

UNITED STATES PATENTS

| | | | |
|---|---|---|---|
| 3,284,716 | 11/1966 | Chopin | 307/229 X |
| 3,188,455 | 6/1965 | Quick, Sr. | 307/229 X |
| 3,405,286 | 10/1968 | Mudie | 307/229 X |

*Primary Examiner*—H. K. Saalbach
*Assistant Examiner*—B. P. Davis
*Attorney*—John J. McGlew et al.

[57] ABSTRACT

A remotely controllable electronic differential resistance comprises an amplifier and a control device. The amplifier can be either a cathode follower valve or a grounded collector transistor, and the control device is a transistor having its collector connected for alternating current to the input electrode of the amplifier, its emitter direct current coupled to the output electrode of the amplifier, and its base connected either to an adjustable source of DC current or to an adjustable source of DC voltage. A potentiometer can be provided by two serially connected such electronic resistances, the base of each control transistor being connected to one pole of a respective constant current source, and the bases of the two control transistors being interconnected through an adjustable current source.

10 Claims, 4 Drawing Figures

REMOTELY CONTROLLED ELECTRONIC DIFFERENTIAL RESISTANCE

FIELD OF THE INVENTION

This invention relates to a remotely controllable electronic differential resistance including an amplifier and a control device, and, more particularly, to an improved electronic differential resistance of this type having effective separation between the signal circuit and the controlling circuit, this being attained in a very simple and inexpensive manner.

BACKGROUND OF THE PRIOR ART

The purpose of electronic resistances is to replace conventional carbon-film potentiometers, more particularly for professional use in studios, broadcasting, television, etc., since carbon-film potentiometers, because of their rubbing contact, deteriorate after relatively little wear, the deterioration being apparent as crackling and general noise. Another disadvantage of carbon-film potentiometers is that they nearly always have to be placed very near the equipment with which they are associated, since they are used usually in switching circuits which are sensitive to interference and in which long leads must be avoided. Consequently, there is no chance of providing a simple form of remote control in which carbon-film potentiometers can be used as the immediate adjusting element.

Attempts consequently have been made to use an adjustable electronic resistance in place of carbon-film potentiometers. In such a case, a control circuit is provided which is substantially decoupled from the circuit to be adjusted, and which is unaffected by interference, so that the differential resistance can be adjusted readily through long control lines.

There are various ways in which an electronic differential resistance of this kind can be embodied, due to the choice of electron-optical components, magnetic components, such as magnetic diodes, field-effect transistors, variable transistors, or the like. The preferred device for this purpose is the field-effect transistor, whose source-drain resistance is used as the variable parameter, such resistance varying in dependence upon the DC voltage applied to the gate electrode.

A disadvantage common to all known circuit arrangements for producing an electronic adjustable differential resistance, however, is that either the distortion, the stability, or the accuracy of adjustment is not sufficiently satisfactory to meet studio requirements.

SUMMARY OF THE INVENTION

In accordance with the present invention, there is provided a remotely controllable electronic differential resistance comprising an amplifier and a control device. In this electronic resistance, the amplifier is either a cathode follower valve or a grounded-collector transistor. The control device is a transistor having its collector connected for alternating current to the input electrode of the amplifier, its emitter direct current coupled to the output electrode of the amplifier, and its base connected either to an adjustable source of direct current or to an adjustable source of DC voltage.

If current control of the control transistor is utilized, the adjustable current source is interposed between the base of the control transistor and the datum line, such as ground. If voltage control of the control transistor is used, the adjustable voltage source is connected between the base and the emitter of the control transistor.

One way of providing a very effective electronic potentiometer is to connect two electronic differential resistances, embodying the invention, in series with each other, with simultaneous and opposite adjustment of the current or voltage sources associated with the two differential resistances.

The advantages of the circuit arrangement of the invention over similar arrangements are mainly that the voltage applied to the control element is the difference between the input voltage and the output voltage, and in grounded-collector amplifiers, the input voltage and output voltage are in phase, the output voltage only being smaller than the input voltage. The voltage across the control device therefore is, for example, reduced by approximately 40 db, with the result that distortion in the overall system is very low and the dynamics are good.

An equally important advantage of a differential resistor embodying the invention is that, by using a transistor as the control device, separation between the signal circuit and the controlling circuit become substantially complete and is attained very simply and above all inexpensively. Separation of this nature is necessary whenever the frequency spectrum of the control pulses lies within the signal-frequency spectrum, as is the case, for example, in studio work, where level variations are needed during recording. Consequently, any adjustable electronic resistance used in high fidelity professional equipment must be able to provide complete separation between the two circuits.

One possible alternative for the transistor is to use a diode whose resistance can be varied by DC biasing. However, in this case there cannot be any separation between the control circuit and the signal circuit, since any abrupt change in DC bias would produce a signal at the amplifier input.

An object of the invention is to provide an improved remotely controllable electronic differential resistance.

Another object of the invention is to provide such an improved remotely controllable electronic resistance in which separation between the signal circuit and the controlling circuit is substantially complete.

A further object of the invention is to provide such a remotely controllable electronic differential resistance which is simple in nature and above all inexpensive.

For an understanding of the principles of the invention, reference is made to the following description of typical embodiments thereof as illustrated in the accompanying drawing.

DESCRIPTION OF THE PREFERRED EMBODIMENT

An electronic differential resistance, embodying the invention, comprises an amplifier and a control device. If a thermionic valve is used, the amplifier is of the cathode follower type. Correspondingly, if a transistor is used as the amplifier, a grounded-collector circuit is used. Both the cathode follower and grounded-collector circuit arrangements have a high input impedance and a relatively low output impedance and, in both cases, amplification is always less than unity. The illustrated embodiments represent only transistorized electronic differential resistances. No thermionic valve circuit arrangement has been illustrated, since one skilled in the art can, for the purpose of the invention, readily use and dimension a cathode follower stage to replace a grounded-collector circuit.

Figure 1:
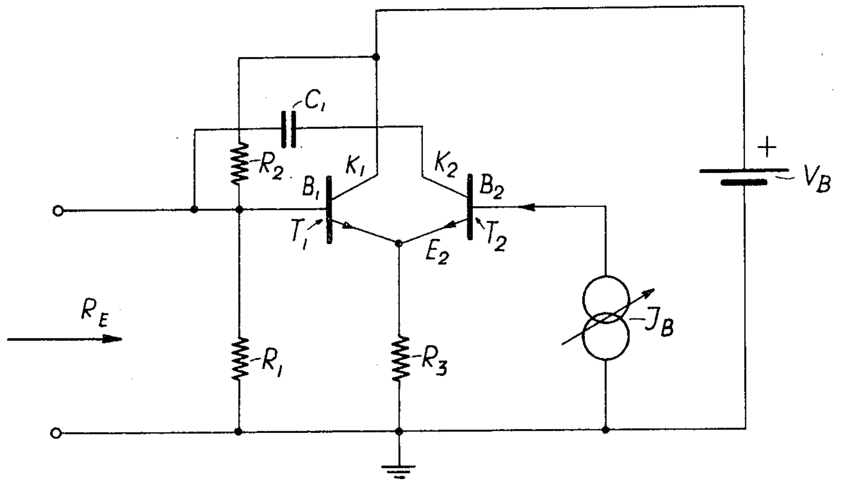
FIG. 1 is a schematic wiring diagram of an electronic resistance, embodying the invention, with control from a current source.
Figure 2:
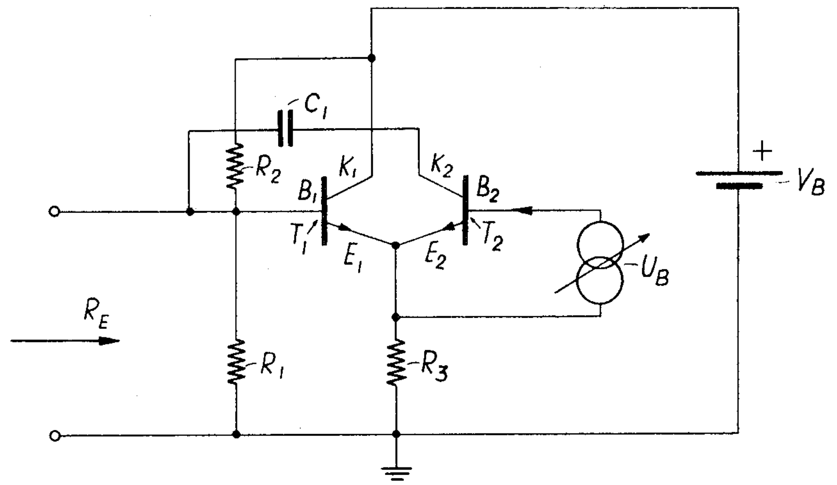
FIG. 2 is a similar schematic wiring diagram illustrating control from a voltage source.

Referring to FIGS. 1 and 2, transistor $T_1$ operates in grounded-collector condition, to provide an approximately 40 db reduction of a signal voltage applied to the control device, depending on the dimensioning of load resistance $R_3$ and of the particular transistor used. A voltage divider comprising resistances $R_1$ and $R_2$ is provided to adjust the working point, and the bias for base $B_1$ of transistor $T_1$ is tapped from the voltage divider. Preferably, the voltage divider is of very high resistance, so as not to reduce excessively the input impedance $R_E$ of the circuit arrangement.

Since a grounded-collector configuration is used, collector $K_1$ of transistor $T_1$ is connected directly to voltwhich it is required to adjust. When a current source or supply is used, as shown in FIG. 1, however, the controlling current has virtually no effect on the potential of the two emitters for, as can be seen from the curves shown in FIG. 3, the collector-emitter voltage $U_{CE}$ of a transistor whose collector direct current voltage is zero is, of course, also zero. The adjusting current therefore cannot produce any signal at emitter $E_1$ of transistor $T_1$.

Figure 3:
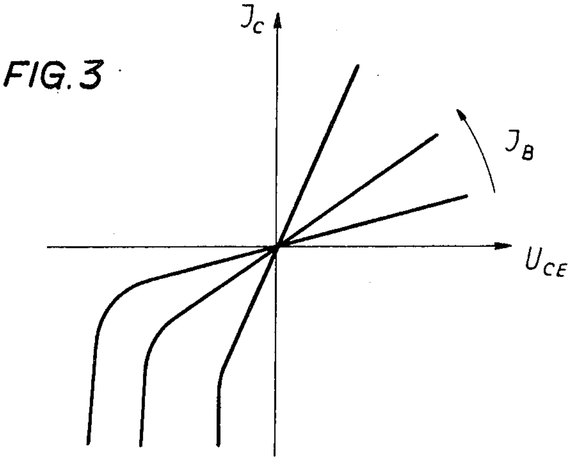
FIG. 3 graphically illustrates a family of characteristics for the purpose of explaining the operation of the invention.

The curves of FIG. 3 also show how the differential resistance of the collector-emitter path of a transistor varies in dependence upon the base direct current bias. Since the straight portions of the curves are short, the drive of the transistor must, of course, be very limited. An adjustable differential electronic resistance, embodying the invention, can be combined as necessary with other similar resistances. If an ohmic resistor is connected in series with an electronic resistance embodying the invention, the result is a remotely controllable voltage divider having one fixed resistance and one variable resistance.

Figure 4:
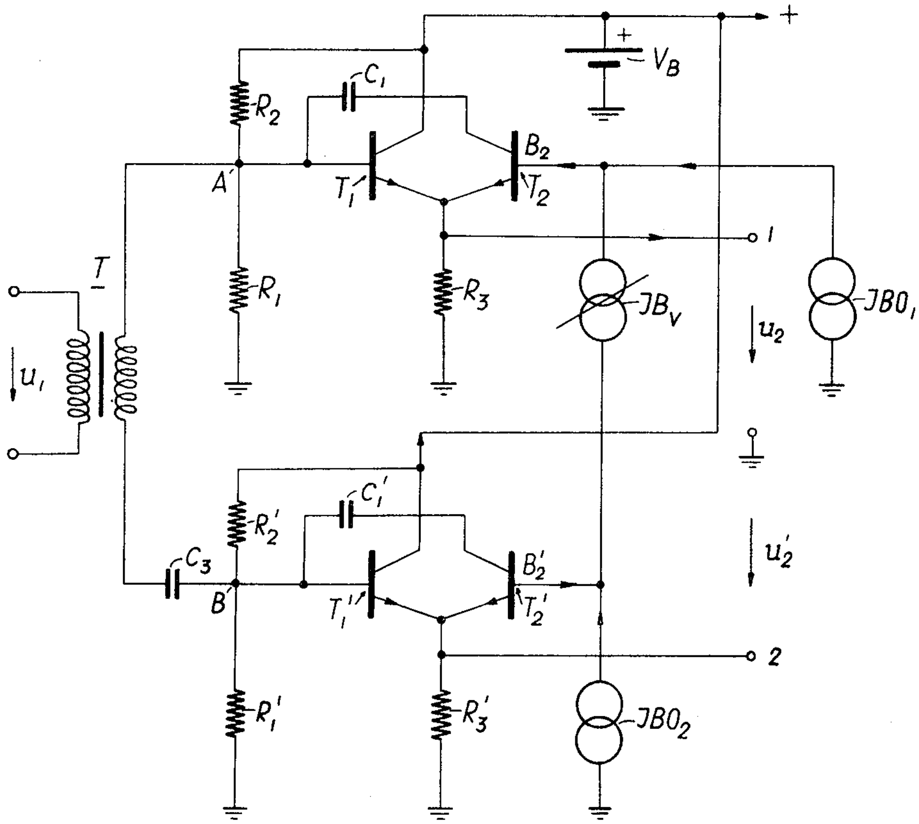
FIG. 4 illustrates an electronic potentiometer comprising two electronic differential resistances embodying the invention and connected in series with each other.

Referring to FIG. 4, an arrangement corresponding completely to a potentiometer, and in which one voltage divider resistance is increased simultaneously as another is reduced can be provided readily by a combination of two electronic resistances embodying the invention. In FIG. 4, two differential electronic resistances, embodying the invention, are illustrated as, in effect, connected in series with one another. A signal voltage source which, in the illustrated embodiment, is a voltage across the secondary winding of an input transformer T is connected between inputs A and B of

What is claimed is:

1. A remotely controllable electronic differential resistance comprising, in combination, an amplifier having an input electrode and an output electrode in grounded circuit arrangement; a control transistor having a base, a collector connected for alternating current to said input electrode through a capacitor, and an emitter coupled to said output electrode; and a variable DC source connected to the base of said control transistor.

2. A remotely controllable electronic differential resistance, as claimed in claim 1, in which said amplifier is a cathode follower thermionic valve.

3. A remotely controllable electronic differential resistance, as claimed in claim 1, in which said amplifier is a grounded-collector transistor.

4. A remotely controllable electronic differential resistance, as claimed in claim 1, in which said adjustable DC source is a variable direct current source connected between said base and a datum line.

5. A remotely controllable electronic differential resistance, as claimed in claim 4, in which said datum line is ground.

6. A remotely controllable electronic differential resistance, as claimed in claim 1, in which said adjustable DC source is a variable voltage source connected between said base and said emitter of said control transistor.

7. A remotely controllable electronic potentiometer comprising two serially connected electronic resistances, each electronic resistance comprising, in combination, an amplifier having an input electrode and an output electrode; a control transistor having a base, a collector connected for alternating current to said input electrode, and an emitter direct current coupled to said output electrode; one pole of a respective constant-current source being connected to the base of each control transistor; and an adjustable current source connected between the bases of said control transistors.

8. An electronic potentiometer, as claimed in claim 7, in which each amplifier has a respective input terminal; an input transformer having a secondary winding connected between said input terminals; a first output terminal common to both electronic differential resistances; and a respective second output terminal connected to each electronic differential resistance; whereby the output of said potentiometer may be derived between said first output terminal and either of said second output terminals.

9. An electronic potentiometer, as claimed in claim 8, including a capacitor connected in series with said secondary winding between said input terminals and providing direct current separation between said input terminals.

10. A potentiometer, as claimed in claim 8, in which said first output terminal is grounded.

* * * * *

UNITED STATES PATENT OFFICE

CERTIFICATE OF CORRECTION

Patent No. 3,739,195 Dated June 12, 1973

Inventor(s) WERNER FIDI, ET. AL.

It is certified that error appears in the above-identified patent and that said Letters Patent are hereby corrected as shown below:

On the cover sheet, insert -- [30] Claims Foreign Priority Data Austria A 10205/70 Nov. 12, 1970 -- .

Signed and sealed this 25th day of December 1973.

(SEAL)
Attest:

EDWARD M. FLETCHER,JR.
Attesting Officer

RENE D. TEGTMEYER
Acting Commissioner of Patents